Oct. 5, 1965  S. O. SCHLAF  3,210,199
FOOD PACKAGE AND METHOD FOR HEATING FOOD THEREIN
Filed Nov. 4, 1960  2 Sheets-Sheet 1
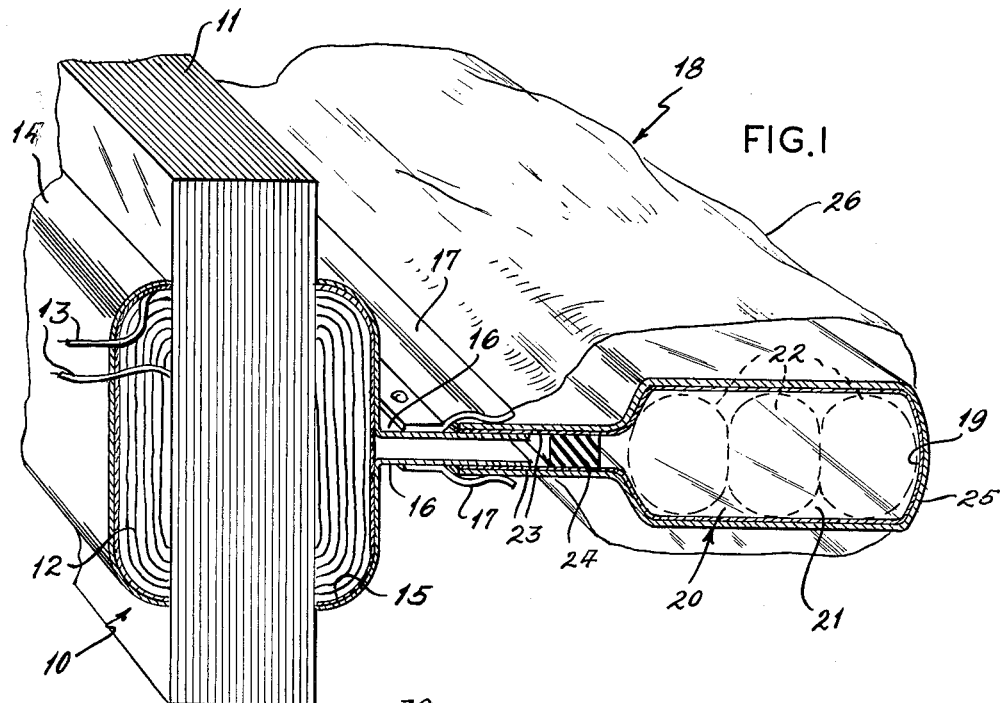
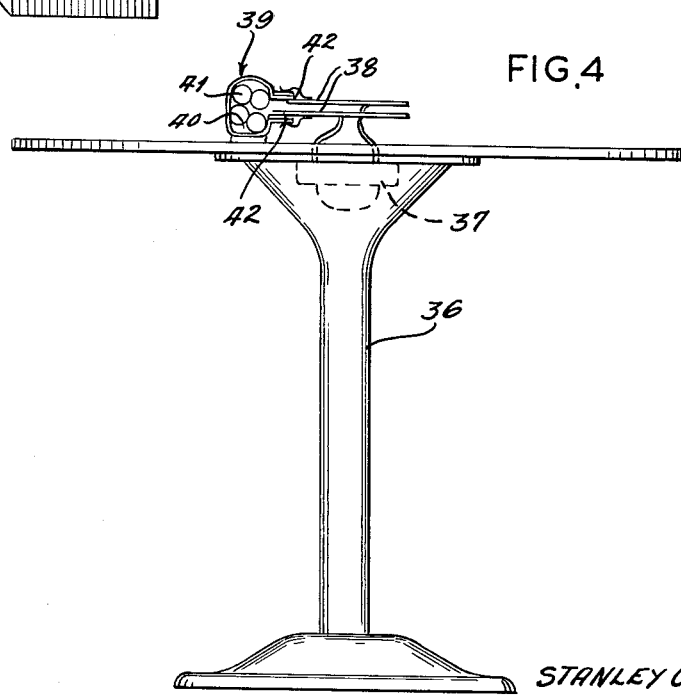
INVENTOR.
STANLEY O. SCHLAF
BY
Gravely, Lieder & Woodruff
ATTORNEYS.

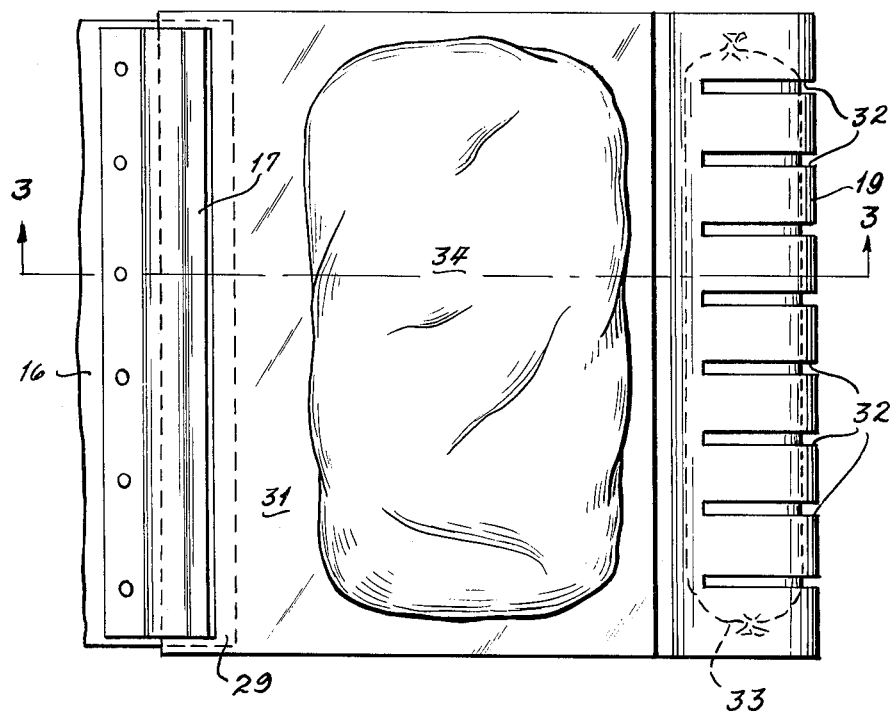
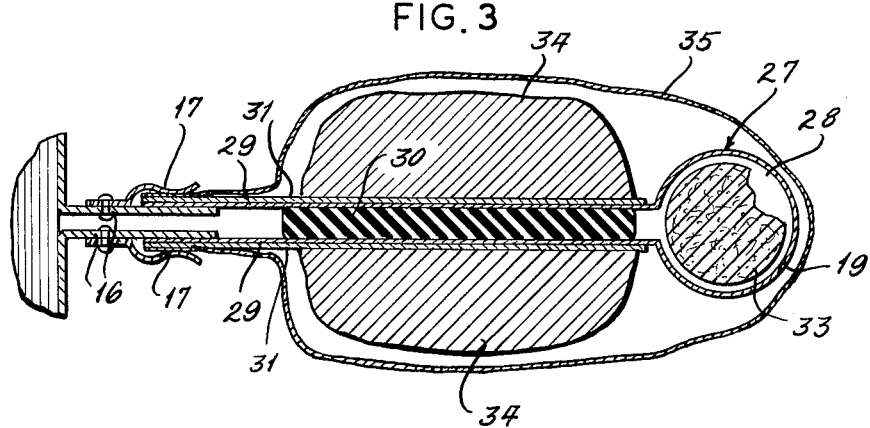

United States Patent Office 3,210,199
Patented Oct. 5, 1965

3,210,199
FOOD PACKAGE AND METHOD FOR HEATING
FOOD THEREIN
Stanley O. Schlaf, St. Louis County, Mo., assignor of
one-half to Jack B. Low, Brooklyn, N.Y.
Filed Nov. 4, 1960, Ser. No. 67,249
5 Claims. (Cl. 99—171)

The present invention relates to novel prepackaged food items adapted to be electrically heated. In particular, the present invention relates to novel packages for electrically heating material contained therein and to methods of heating the packages and contents.

Providing food service for multitudes of people massed in business and industrial areas is a problem which is becoming more and more acute. Unless a manufacturer can provide restaurant on the premises, it is wasteful and time-consuming for employees to leave the premises for lunch. Catering services and vending machines are both expensive and often times slow with poorly prepared food. Particularly, is this true with items which need to be hot when served.

It is an object of the present invention to obviate the foregoing problems and to provide a food package which can be heated ready to serve in a very short time and to provide a method of making and heating the packages. Another object of this invention is to provide food heating and serving means suitable for use in unattended automatic vending machines. Another object of this invention is to provide means to enable food to be prepared and packaged under sanitary conditions, said package being adapted to heat and food contained therein at a later time and place as required.

Another object of the present invention is to provide a food heating package and method of making same wherein preselected areas are selectively heated so that in a prepackaged sandwich, for example, the meat is thoroughly heated to a palatable temperature, while the bread portion is warmed only and will not be desiccated by excessive heat.

Still another object of this invention is to provide an inexpensive and disposable electrically heatable food package capable of heating the food contained therein without causing any significant voltage drop to appear in contact with the contained food, thus avoiding deleterious effects from electrolysis or galvanic action.

It is a further object to provide a non-returnable disposable, one-way carton formed of a flexible electric conducting, non-rigid sheet material, preferably aluminum foil, of the type conventionally used to wrap food items, said carton being adapted to enclose a food parcel on a plurality of sides to heat said food uniformly from several sides.

A further object of this invention is to provide a combination comprising a thin metallic foil or other electrically conductive membrane which is employed to serve as a food package and as an electric resistance heating element for heating the food contained therein upon application of an appropriate electromotive force along the width of the foil or membrane.

A further object is to provide a method and means for applying electrical energy to an electrically heatable food package to produce rapid heating of the food contained therein.

Still another object is to provide an electrically heatable food package wherein a thin electrically conductive film laminated to a resilient body is urged to efficient contact with a low impedance power source by means of uniform broad area pressure applied to the reverse side of the laminate.

Still another object is to provide a method of heating prepared food in a food package. Still another object is to provide a package which is adapted to enclose a food item for heating and to which a power source can be applied to cause the interior of said package to be heated, and to a method of heating said package.

These and other objects and advantages will become apparent hereinafter.

The present invention comprises a food package having an inner surface which heats when an electromotive force is applied thereto to heat the food contained in the package. The invention further comprises a method of heating food enclosed in an electrical resistance container by applying a low voltage thereto. The invention further comprises the food package and heating means and methods of making same, as hereinafter described and claimed.

In the drawings wherein like numerals refer to like parts wherever they occur,

FIG. 1 is a partially broken perspective view of the present invention,

FIG. 2 is a top plan view of a modification of the present invention,

FIG. 3 is a sectional view taken along line 3—3 of FIG. 2, and

FIG. 4 is a side elevational view of a further modification of the present invention.

FIG. 1 shows a source of electrical energy such as a transformer 10 of the standard step-down type having a core 11, a primary winding 12 with leads 13 thereto, and a secondary winding 14 separated from the primary winding 12 by an insulator 15. The stepdown transformer 10 is designed to deliver a substantial amount of power at low voltage (for example, 500 ampreres at one volt). Because of the high current density, the secondary winding 14 generally has few turns and may even be a one-turn conductor terminating in a pair of contacts 16.

A broad clamp structure 17 capable of exerting uniform contact pressure along its entire width is fastened to the secondary winding strip contacts 16.

The novel food package 18 shown in FIG. 1 comprises an inner layer 19 of a material capable of being rendered conductive, such as metal foil, particularly aluminum foil. The thin metal membrane 19 is formed into an electrical resistance heater 20 having a body portion 21 enclosing a food item 22 to be heated and contacts 23 adapted to engage the secondary winding contacts 16. An insulator 24 separates the contacts 23. Laminated to the outer surface of the metal foil 19 is a resilient backing material 25 such as cardboard, which serves as an insulator to retain the heat inside the heater 20, and in conjunction with the clamp 17 provides the equivalent of a myriad of means urging the contacts 16 and 23 into close engagement. A plastic overwrap 26 encloses the entire package 18 to keep the package 18 sanitary.

The electrical resistance heater 20 preferably comprises an inner layer of aluminum foil 19 laminated to a resilient cardboard backing 25 adapted to be formed into a container for heating a food parcel. The heater 20 has a contact area 23 at the outer margins with a spacer 24 positioned adjacent to the inner surface of the aluminum foil 19 to insulate and space the contacts 23 when the heater 20 is formed into a food package.

In the modification of the present invention shown in FIGS. 2 and 3, an electrical resistance heater 27 having a heating portion 28 and an elongated contact portion 29 is adapted to engage a source of electrical energy such as the secondary winding contacts 16 of a step-down transformer (not shown). An insulator 30 spaces apart the elongated contacts 29. An insulating backing 31 is positioned adjacent to the outer surface of the elongated contacts 29. The heating portion 28 is formed of a thin metal foil 19 provided with cutouts or slots 32 to concentrate the voltage drop in the heating area 28. Thereby the portion of the food parcel contained in the heating area 28 is heated vigorously, while the remainder of the food package adjacent to the contact area 29 is only warmed slightly. FIGS. 2 and 3 show a food package including a weiner 33 and a weiner bun 34. The weiner 33 is placed in the heating area 28, while the two halves of the bun 34 are placed adjacent to the insulated backing 31 on either side of the metal foil contacts 29. A plastic overwrap 35 keeps the entire package sanitary. Metal spring clips 17 urge the heating element contacts 29 into continuous longitudinal engagement with the transformer contacts 16 to insure low contact resistance and thus low contact losses.

FIG. 4 shows another modification of the present invention. A table 36 is fitted with a step-down transformer 37 having secondary winding contacts 38. A food package 39 having a heating area 40 containing food parcels 41 and contacts 42 engages the transformer contacts 38. The transformer 37 is positioned in the pedestal of the table 36 with the contacts 38 extending on top of the table. In this modification, the customer can purchase the prewrapped food package 39 from a vending machine and then plug the food package 39 into the transformer contacts 38 and enjoy a heated meal. For a complete meal, soup and drink items can be purchased from vending machines and consumed at the table 36 while the food package 39 is heating.

In the preferred form of the invention, the transformer 10 shown in FIG. 1 is encased in a vending machine (not shown) with the contacts 16 extending in a slot open to the outside of the vending machine. When a coin is inserted in the machine, the food package 18 is released and the transformer 10 activated. The customer then inserts the food package contacts 23 into the machine slot to engage the transformer contacts 16 to heat the purchased food package 18.

The food packages can be prewrapped at a food processing plant and then inserted into a permanently positioned vending machine at a different location.

Thus it is seen that the present invention embodies a novel food package which achieves all of the objects and advantages sought therefor.

This invention is intended to cover all changes and modifications of the examples of the invention herein chosen for purposes of the disclosure, which do not constitute departures from the spirit and scope of the invention.

What is claimed is:

1. A food package comprising an item of food, a thin electrically conductive film material innerwrap enclosing said food item and constructed and arranged to heat when an electromotive force is applied thereto, said film innerwrap having continuous end margins along its width, a resilient backing along the end margins of said electrically conductive film material and continuing along the width thereof, said end margins being solid contacts for connecting said electrically conductive film material continuously along its width to a low impedance power source, and means spacing said end margin contacts.

2. The package defined in claim 1 wherein the film member is provided with portions of varying resistivity to correspondingly vary the heat generated over its entire area.

3. The package defined in claim 1 wherein the film is aluminum foil and said package includes a sanitary over wrap.

4. The package defined in claim 1 wherein the film innerwrap is heated to heat the food contained therein as approximately a one volt electromotive force applied across the end margin contacts flows in a substantially continuous path around the enclosed food item between the contacts.

5. A method of heating food enclosed in a package which comprises an outerwrap, an electrical resistance innerwrap enclosing the food, said innerwrap extending substantially across the width of the package and having opposed continuous margins along its width with resilient backing along the end margins with means spacing the end margins, said method comprising the steps of urging the spaced end margins of the innerwrap into substantially continuous electrical contact along their width with a pair of elongated spaced strip contacts, applying a low voltage of approximately one volt across said contacts, applying said voltage substantially uniformly along the total length of said innerwrap end margins, and causing the voltage to flow in a continuous substantially direct path around the enclosed food item over the width of the innerwrap between the contacts for a period of time sufficient to heat the food between the contacts.

References Cited by the Examiner

UNITED STATES PATENTS

| | | | |
|---|---|---|---|
| 2,276,643 | 3/42 | Bates | 219—50 |
| 2,287,956 | 6/42 | Aff | 99—329 |
| 2,325,585 | 8/43 | Black et al. | 219—50 |
| 2,474,390 | 6/49 | Aff | 99—109 |
| 2,532,014 | 11/50 | Davis | 219—19.21 |
| 2,542,245 | 2/51 | Gottesman. | |
| 2,807,550 | 9/57 | Zarotschenzeff et al. | 99—174 |
| 2,844,695 | 7/58 | McLean | 99—107 X |
| 2,912,336 | 11/59 | Perino | 99—174 |
| 3,100,711 | 8/63 | Eisler | 99—171 |

A. LOUIS MONACELL, *Primary Examiner.*

ABRAHAM H. WINKELSTEIN, TOBIAS E. LEVOW, NORMAN G. TORCHIN, *Examiners.*